(12) United States Patent
Jarvinen

(10) Patent No.: US 9,642,190 B2
(45) Date of Patent: May 2, 2017

(54) EMBEDDED TURBOFAN DEICER SYSTEM

(71) Applicant: Philip Jarvinen, Nashua, NH (US)

(72) Inventor: Philip Jarvinen, Nashua, NH (US)

( * ) Notice: Subject to any disclaimer, the term of this patent is extended or adjusted under 35 U.S.C. 154(b) by 242 days.

(21) Appl. No.: 14/831,240

(22) Filed: Aug. 20, 2015

(65) Prior Publication Data
US 2016/0353523 A1     Dec. 1, 2016

Related U.S. Application Data

(60) Provisional application No. 62/168,083, filed on May 29, 2015.

(51) Int. Cl.
*F01D 15/10*   (2006.01)
*F01D 25/02*   (2006.01)
(Continued)

(52) U.S. Cl.
CPC ............... *H05B 3/16* (2013.01); *F01D 5/08* (2013.01); *F01D 15/10* (2013.01); *F01D 25/02* (2013.01);
(Continued)

(58) Field of Classification Search
CPC . F01D 5/08; F01D 15/10; F01D 21/10; F01D 21/12; F01D 25/02; F02C 7/047;
(Continued)

(56) References Cited

U.S. PATENT DOCUMENTS 5,281,091 A * 1/1994 Dooley .................. F02C 7/047
244/134 D 7,439,877 B1 * 10/2008 Jarvinen ................ B64D 15/20
340/581

(Continued)

FOREIGN PATENT DOCUMENTS

DE    EP 1156189 A1 * 11/2001 ............... F01D 5/18
GB         681186 A  * 10/1952 ............. F02C 7/047

OTHER PUBLICATIONS

Pasztor, Andy, "Airline Regulators Grapple with Engine-Shutdown Peril", "http://online.wsj.com/article/SB120753185285993925.html" The Wall Street Journal, Apr. 7, 2008, accessed Aug. 20, 2015.
(Continued)

*Primary Examiner* — Gregory Anderson
*Assistant Examiner* — Christopher R Legendre
(74) *Attorney, Agent, or Firm* — Hayes Soloway P.C.

(57) ABSTRACT

An embedded turbofan deicer system (ETDS) may eliminate the ingested ice crystal icing problem plaguing high bypass turbofan engines operating at high altitudes near convective tropical storms: icing occurring on the surfaces of the engine's rotating engine spinner, fan blades, low pressure compressor casing and low pressure compressor and causing loss of power and on occasion engine flameouts. The invention supplies electricity to heat these engine parts using at least one reversed permanent magnet electric generator (reversed PMEG) driven by the turbofan's central drive shaft with all parts of the ETDS mounted internal to the engine in presently unused internal spaces without requiring modifications to the existing engine. All electric power produced by the rotating reversed PMEG supplied directly to rotating engine parts requiring heat for deicing. A unique method to deice metal, composite and metal/composite fan blades is included in the invention using electricity from the reversed PMEG.

21 Claims, 10 Drawing Sheets

(51) Int. Cl.
| | |
|---|---|
| F01D 5/08 | (2006.01) |
| F02C 7/047 | (2006.01) |
| F04D 29/32 | (2006.01) |
| F04D 29/58 | (2006.01) |
| H05B 3/16 | (2006.01) |
| H05B 3/14 | (2006.01) |

(52) U.S. Cl.
CPC ............ *F02C 7/047* (2013.01); *F04D 29/324* (2013.01); *F04D 29/584* (2013.01); *H05B 3/145* (2013.01); *F05D 2220/36* (2013.01); *F05D 2220/768* (2013.01); *F05D 2240/303* (2013.01); *F05D 2300/611* (2013.01); *H05B 2203/013* (2013.01); *H05B 2203/014* (2013.01); *H05B 2214/02* (2013.01)

(58) Field of Classification Search
CPC ................. F04D 29/324; F04D 29/584; F05D 2220/768; F05D 2240/303
See application file for complete search history.

(56) References Cited

U.S. PATENT DOCUMENTS

| | | | | |
|---|---|---|---|---|
| 7,897,214 | B2* | 3/2011 | Poullos | B05D 1/06 427/202 |
| 8,006,934 | B2* | 8/2011 | Alexander | F02C 7/047 219/526 |
| 8,522,522 | B2* | 9/2013 | Poisson | F01D 15/10 60/39.093 |
| 9,133,714 | B2* | 9/2015 | Vontell | F01D 5/147 |
| 2006/0137355 | A1* | 6/2006 | Welch | B64D 41/007 60/772 |
| 2014/0366552 | A1* | 12/2014 | Szwedowicz | F02C 7/047 60/779 |
| 2015/0377129 | A1* | 12/2015 | Ward | F01D 15/10 60/39.093 |
| 2016/0138419 | A1* | 5/2016 | Kray | F01D 9/02 415/208.1 |
| 2016/0353523 | A1* | 12/2016 | Jarvinen | F02C 7/047 |

OTHER PUBLICATIONS

Norris, Guy, "Core Engine Icing Strikes Russian 747-8F", "http://www.aviationweek.com/Article/aspx?id=/article-xml/AW_09_02_2013_p20-610669.xml/", accessed Aug. 20, 2015.
Reuters, "Boeing Warns of Icing Risk on Some Planes", The New York Times, Nov. 23, 2013, http;//www.nytimes.com/2013/11/24/busikness/boeing-warns-of-icing-risk-on-some-planes.html?_r=0, accessed Aug. 20, 2015.
Reuters, "Boeing issues warning: Further icing problems with GE GenX engines on Boeing aircraft", http://ktwop.worldpress.com/2013/11/23/further-icing-problems-with-ge-genex-engines-on-boeing aircraft/, accessed Aug. 20, 2015.
Norris, Guy, "JAL Surprises Boeing, GE with 787 Withdrawals", http://www.aviationweek.com/Articles.aspx?id=article-xml/AW_12_02_2013_p30-640739.xml/, accessed on Aug. 20, 2015.
Staunton, R.H. et al, "Evaluation of 2004 Toyota Prius Hybrid Electric Drive System", ORNL/TM-2006-423, May 2005., http://www.engr.uvic.ca/~mech459/Pub_References/890029.pdf/.
Burress, T.A. et al, "Evaluation of the 2007 Toyota Camry Hybrid Synergy Drive System", ORNL/TM-2007/190, Apr. 2008., http://www.osti.gov/scitech/servlets/purl/928684.
Burress, T.A. et al, "Evaluation of the 2008 Lexus LS 600H Hybrid Synergy Drive System", ORNL/TM-2008/185, Jan. 2009, http://www.osti.gov/scitech/biblio/947393/.
Staunton, R. H. et al, "Evaluation of 2005 Honda Accord Hybrid Electric Drive System", ORNL/TM-2006-535, Sep. 2006.
Aydin, M. et al, "Axial Flux Permanent Magnet Disc Machines: A Review", lipo.ece.wisc.edu/2004pubs/2004_10 pdf/, retrieved on Aug. 20, 2015.
"Fan Blades: Titanium Vs Composite", http://www.airliners.net/aviation-forums/tech_ops/read.main/318537/, accessed on Aug. 20, 2015.
Lightning Strike Protection for Composite Structures, Gardiner, Ginger, Jul. 2006, http://www.compositesworld.com/articles/lightning-strike-protection-for-composite-structures, accessed Aug. 20, 2015.
Jarvinen, Philip A., "A Flywheel Energy Storage and Conversion System for Photovoltaic Applications—Final Report", DOE/ET/20279-159, Mar. 1982, 227 pp.

* cited by examiner

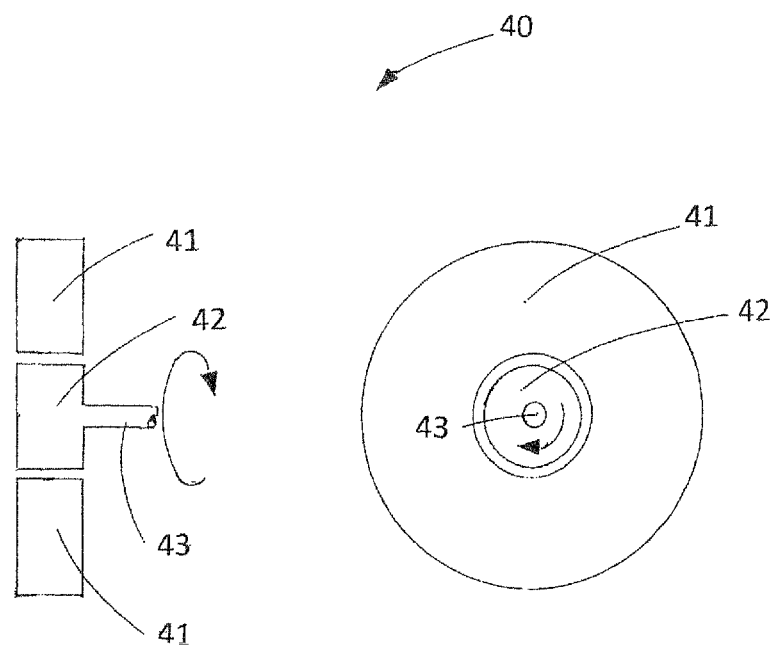
FIG. 4 A
Prior Art
FIG. 4 B
Prior Art
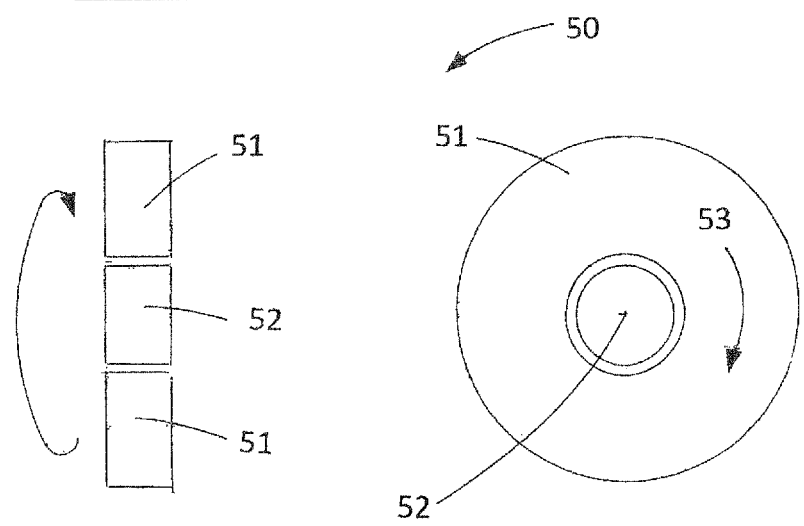
FIG. 5 A
FIG. 5 B

EMBEDDED TURBOFAN DEICER SYSTEM

CROSS REFERENCE TO RELATED APPLICATION

This application claims benefit of U.S. Provisional Application Ser. No. 62/168,083, entitled, "Embedded Turbofan Deicer System" filed May 29, 2015, the entire disclosure of which is incorporated herein by reference.

FIELD OF THE INVENTION

The invention relates to the field of aircraft turbofan engine deicing devices. In particular to methods and devices used to prevent the build-up of ice internal to an aircraft's turbofan engine of high bypass ratio when operating at high altitudes typically above 30,000 feet; a recently encountered phenomenon. The ice caused by ice crystals existing in the atmosphere near tropical storms which are ingested into the engine. In the turbofan engine, the ingested ice crystals form ice that adheres to internal elements of the engine including rotating engine spinner, fan blades, low pressure compressor casing and low pressure compressor as well as air flow passages leading to the engine's combustion chambers with the ice, so deposited, interfering with air flow and engine operation causing loss of power and/or engine flameout. The present invention provides a deicer system, installed completely internal to the turbofan engine in normally empty spaces, which supplies electricity to rotating engine parts to heat and melt any ice deposits. The electric energy is provided by an internal electric generator attached to the engines central drive shaft with the electricity supplied to heating elements attached on the rotating engine parts to be heated along with a unique way to heat the fan blades. A reversed permanent magnet electrical generator (reversed PMEG) being the preferred embodiment which supplies the electricity with the reversed PMEG for the turbofan engine differing in operation from that of conventional PMEGs in that the functions of rotating parts and stationary parts are reversed between conventional PMEGs and the turbofan engine PMEG. The permanent magnets previously rotating, now fixed in place and the generator windings previously fixed, now rotating to form the reversed PMEG of the present invention.

BACKGROUND OF INVENTION

Internal ice deposits have occurred recently on turbofan powered aircraft operating at high altitudes, typically above 30,000 feet and near tropical convective storms. These internal ice deposits have effected engine operation detrimentally: causing loss of engine power and in some cases engine flameouts. The present status of knowledge concerning turbofan engine internal icing is that internal icing is known to occur based on incidents of icing experienced by small aircraft as well as by large passenger jet airliners: incidents that have been experienced and continue to be experienced. However, no understanding of the circumstances or the factors responsible for this type of internal icing is available.

Factors that are different in the new turbofan engine internal icing phenomena compared to engine icing previously encountered are that it is occurring at higher altitudes and in proximity to tropical convective storms. A lack of knowledge regarding the upwelling weather in tropical convective storms is also hindering an understanding of the icing phenomena. A number of theories as to the cause of high altitude turbofan engine internal icing have been offered with some theories lacking a sound basis because they do not take into account engine operation in proximity to a tropical convective storm and other theories suffering from a lack of detailed information about the process.

In 2004, several jet engine shutdowns were experienced on small jet powered aircraft such as the Raytheon's Beechjet aircraft. In this incident, the aircraft had both engines shut down unexpectedly while flying near Jacksonville, Fla. in bad weather at 38,000 feet: the shutdown subsequently believed to be due to internal icing. In 2005, a similar Beechjet aircraft experienced another high altitude shutdown. Additional shutdowns attributed to the new icing phenomena occurred in 2006 with both engines of a Qatar Airways Airbus A330 airliner shut down as the aircraft approached Shanghai airport. Though the engines quickly restarted and a safe landing was accomplished, the shutdown was subsequently attributed to ice deposits inside the jet engines: a situation never before thought possible by the airline industry, aircraft manufacturers and jet engine suppliers.

Reported icing shutdown incidents have continued to this day including the unexpected damage that occurred to three of four engines on an AirBridge Cargo Boeing 747-8F aircraft on Jul. 31, 2013 during cruise at 41,000 feet near Chengdu, China when it was believed to have experienced ice crystal ingestion. In November 2013, Boeing warned airlines about the high altitude icing risk near tropical storms on its new 747-8 and 787 Dreamliner aircraft with high bypass engines made by General Electric, suspected again to be due to ice crystal ingestion. This warning came after six incidents from April to November involving five 747-8s and one 787 in which the aircraft powered by GE's GEnx engines suffered temporary loss of thrust while flying at high altitudes above 30,000 feet. Subsequently, Japan Airlines banned the use of the Dreamliner aircraft in their fleet from flights between Tokyo and Delhi and Singapore as well as on Tokyo to Sydney routes to avoid possible encounters with high altitude tropical storms containing ice crystals.

At the present time, attention is focused on the ingestion of atmospheric ice crystals as the agent responsible for turbofan engine internal icing with several theories offered. It is theorized that some of the ice particles being ingested into the turbofan engine at high altitudes melt and form water due to the increase in inlet air temperature as the air passes into the engine. It is also theorized that additional ice crystals that continually bombard the internal surfaces of the engine lower the surface temperatures to a value that cause the melted water and some of the remaining ice crystals to freeze together on the internal surfaces of the engine. It is also theorized that the ice deposits increase in thickness with time and interfere with the air flow to the engines combustors causing loss of engine power and flameout of the engine. However, experimental measurements supporting these theories are missing, The upwelling weather near intense tropical storms is not well understood either nor are the effects of the tropical storm understood on how it effects the location and size of ice crystals in the atmosphere thru which the aircraft is passing. The weight of ice crystals and the size of the ice crystals in the atmosphere near tropical storms differ depending on the source of the information studied with various values offered that are in conflict with each other. For instance, NASA Lewis in their wind tunnel icing experiments, to solve the high altitude icing problem, use spray nozzles that produced 5 micron diameter ice crystals though satellite measurements have shown the ice crystals in the upper atmosphere to be larger: in the range from 20 to over 600 microns. Aviation Week and Space Technology magazine also reported that the maximum weight density of ice crystals to be 9 grams per cubic meter while data taken by NASA on recent test flights in tropical zones, still undergoing data reduction and unreported publicly, seem to indicate fewer (lower weight loading) of ice crystals and ice crystals of larger diameter than previously thought. Therefore, in the sample calculation conducted later for the amount of electric power that needs to be provided by the reversed permanent magnet electric generator (reversed PMEG) of the present invention for deicing, a range of weight loadings for ice crystals between 3 grams per cubic meter and 9 grams per cubic meter, are assumed rather than a single value of 9 grams per cubic meter.

What is known without doubt at this time is that icing occurs within turbofan engines with high bypass ratios operating at high altitudes near tropical storms, that icing is related to the existence of ice crystals that are ingested into the aircraft's engines near these storms, and that as a result of ice crystal ingestion and the deposition of ice crystals within the engine, normal engine operation is interfered with. Ingestion of ice crystals is known to be accompanied by icing of internal engine parts with a majority of that icing occurring on the rotational parts of the turbofan engine including engine spinner, fan blades, low pressure compressor casing and low pressure compressor. What is needed is a means to counteract internal icing on these turbofan engines: the type of engines used now on a majority of commercial and passenger aircraft.

Thus, a heretofore unaddressed need exists in the industry to address the aforementioned deficiencies and inadequacies.

SUMMARY OF INVENTION

The present invention provides an embedded turbofan deicer system (ETDS) that prevents high altitude internal icing of turbofan engines operating near tropical storms. The ETDS particularly preventing icing occurring on internal turbofan parts including rotating engine spinner, fan blades, low pressure compressor casing and low pressure compressor. The ETDS of the present invention preventing icing and consisting of several subsystems. It includes an instrumentation subsystem, control subsystem, electric generation subsystem, electric switching subsystem, electric distribution subsystem and heating element subsystem.

The instrumentation subsystem comprised of two parts: a temperature measurement part and an ice detection part. The ice detection part of the present invention detects ice deposits as they initially form on internal turbofan engine parts, further detects any additional ice deposits that occur on these parts with time, specifies which of the parts, or all, is experiencing internal icing and supplies that information to the control subsystem. The preferred embodiment of the ice detection subsystem for the present invention is that described in U.S. Pat. No. 7,439,877, entitled "Total Impedance and Complex Dielectric Property Ice Detection System": a combination of self-heating thermistor measurements and electrical impedance measurements. The instrumentation subsystem's temperature measurement part continuously measures temperatures at various locations in and on engine parts and supplies that information to the control subsystem. The preferred embodiment for temperature sensors in the present invention being thermocouples and thermistor devices. The control subsystem includes a computer, software and algorithms which together are used to interpret where and at what rate icing is occurring. The control subsystem allocates the amount of electricity to each engine part to prevent icing. At each engine part, the electricity is converted to heat and used to maintain the part at a preselected temperature level that melts any ice.

The electric generation subsystem generates electric power by converting turbofan engine rotational energy to electricity. In the present invention, the preferred embodiment for the electrical generation system is a permanent magnet electric generator (PMEG) converting engine central drive shaft rotational energy to electricity. The turbofan PMEG of the present invention is composed of two parts: a stationary part containing the permanent magnets attached to the stationary structure of the engine and a rotating part consisting of generator windings attached to the turbofan engine's central drive shaft: a reversed PMEG configuration from a conventional PMEG. It is in the rotating generator windings that electric energy is generated when they pass through the magnetic fields produced by the stationary magnets: the two parts meshing together inside one another and nearly in contact with each other. More than one reversed PMEG is mounted on the turbofan engine's central drive shaft depending on the amount of unused and empty internal space existing in a specific engine design and available for use by the reversed PMEG and the amount of electric energy to be generated. The reversed PMEG may produce single-phase, three-phase and poly-phase electricity depending on the design of the generator windings.

The electrical distribution subsystem includes: the wiring that carries the electrical power to the heating elements on each engine part to be deiced where the electricity is converted to heat and used to melt the ice, the switching network used to turn the electricity on and off to the engine parts to be heated as commanded by the control subsystem and electric power converters which condition some of the electric AC power to AC and DC power utilized to operate the instrumentation subsystem, the control subsystem and the electrical distribution subsystem. The electric distribution subsystem also including an electric ground between the reversed PMEG and the aircraft's airframe to complete the electric circuit.

The heating element subsystem equips each turbofan engine part that needs to be deiced with heating elements that convert the electricity to heat. The heating elements are in several forms including electrically resistive wires, resistive pads, resistive coatings, and resistive films which are surface mounted or embedded in the engine part and used to heat them: each part having a heating element which is appropriate in physical geometry and heat level needed to deice the part. Since these heating elements are mounted on or embedded in engine parts, the heat deposited in them spreads thru the engine parts by conduction to melt the surface ice. Since the heating elements are also embedded in or near the airstream passing through the engine, any heat deposited in the heating elements is also conducted into the passing airflow thus raising the temperature of the air stream passing thru the turbofan engine. The additional heat deposited in the airstream subsequently passing over the rotating and stationary blades in the low pressure compressor and the downstream walls of the low pressure compressed air ducts, heating them also and providing protection against any ice forming on them.

The embedded turbofan deicer system of the present invention is configured to be mounted entirely inside the turbofan engine and within normally vacant and unused internal engine volumes. Electric energy generated by the reversed PMEGs is used to heat the external surfaces of the rotating parts of the turbofan engine: surfaces susceptible to icing if not heated.

The reversed PMEG of the present invention differs in configuration from conventional PMEGs. Conventional PMEGs are designed to have rotating permanent magnets surrounded by fixed generator windings with the electric energy so generated in the fixed generator windings consumed by applications attached on the non-rotating side of the PMEG: for example, the configuration used in hybrid electric cars where the engine shaft drives a central rotor containing the magnets. The present invention employs a reversed PMEG with a different configuration in which the permanent magnets are stationary with respect to the rotating generator windings adjacent to the magnets. The electric energy generated in the rotating generator windings is provided directly to rotating engine parts where icing is expected to occur. The rotating generator windings are directly attached to the engine's central drive shaft.

This is achieved in the present invention by physically supporting the permanent magnets of the reversed PMEG from the stationary, non-rotating portion of the exterior shell of the turbofan engine with the generator windings attached to the rotating central drive shaft of the turbofan engine: the permanent magnets of the present invention still centrally located within the exterior generator windings in a paired relationship, the same as in hybrid cars and trucks. Since the reversed PMEG of the present invention and previous PMEGs differ only in which part of the PMEG is rotating, information available from measurements made previously on electrically powered hybrid cars applies directly to the reversed PMEG of the present invention. Such measurements which established the state-of-the-art of electrically powered hybrid car are examined below and used to establish a minimum value for the power density for the reversed PMEG of the present invention.

It should be noted that the power density level derived from information available from hybrid car measurements and used in the example that follows is representative of that for the reversed PMEG of the present invention since both employ the same type of permanent magnets and generator windings. However, the mass density value that is found for hybrid car PMEGs is expected to be larger than the value used for the reversed PMEG of the present invention. This is because of the differing structural design factors used for a PMEG in a hybrid car in comparison to those used in the design of the reversed PMEG of the present invention: the aerospace application seeing lower loads and requiring smaller safety factors in its design.

With regard to conventional PMEGs, ones where the magnets rotate and the generator windings are fixed, such PMEGs have been studied for decades for use in industrial, commercial and engineering applications. In the early 1980's, a PMEG that incorporated all the features of more modern conventional PMEGs, was developed and tested at Massachusetts Institute of Technology's Lincoln Laboratory (MIT-LL) for the US Department of Energy; the present patent applicant being principal investigator on the effort. In that application, the PMEG was used to power a solar photovoltaic flywheel energy storage unit, with the PMEG acting as an electric motor to accelerate the flywheel during the day and as an electric generator to convert flywheel momentum to AC electricity during the night.

Starting in the early 2000's and continuing to today, new interest in conventional PMEG's and their use in electric and hybrid automobiles has arisen. For instance, in the period from 2005-2008, the U.S. Department of Energy, thru their FreedomCar and Vehicle Technologies program funded efforts at Oak Ridge National Laboratory (ORNL) to test and characterize a number of hybrid automobiles employing conventional PMEGs such as the Toyota Prius, Toyota Camry, and Toyota Lexus. These investigations measured the state-of-the-art of PMEGs, in particular PMEG drive motors, as of that time period. The PMEGs studied by ORNL are known as radial magnetic flux machines.

The motor power ratings of Prius, Camry and Lexus automobiles, studied by ORNL, being 50 kW, 70 kW and 110 kW respectively, with measured motor specific power found to be 1.1 kW/kg, 1.68 kW/kg and 2.46 kW/kg respectively and motor volume density of 3.25 kW/L, 4.73 kW/L and 6.59 kW/L respectively. The motors on the three cars having outside diameters of 10.59 inches (26.9 cm), 10.39 inches (26.4 cm) and 7.87 inches (20 cm), stack lengths of 3.3 inches (8.4 cm), 2.39 inches (6.1 cm) and 5.33 inches (13.5 cm) and motor speed ratings of 6,000 rpm, 14,000 rpm and 10,230 rpm respectively. All of the PMEG electric motors in these automobiles being of the radial magnetic flux type with pancake shape with the plane of the pancake perpendicular to the engine drive shaft and with the pancake configuration containing both the interior rotor with the permanent magnets surrounded by the fixed exterior generator windings. It is seen from the test results quoted above, which occurred at consecutively later calendar times, that as the technology of automobile PMEGs matured, motor power density and motor volume density improved. The range of motor rpm's used in the automobiles considered above, 6,000 rpm to 14,000 rpm, cover the range that are to be used in the present invention: thus establishing the suitability of applying these test results to form estimates for the weight and electric generation capabilities of the embedded turbofan deicer system of the present invention.

The highest measured motor specific power density of 2.46 kW/kg noted above for the Lexus automobile coupled with its motor volume density of 6.59 kW/L are selected and used later in a sample calculation to compute the minimum amount of electric energy that can be generated in a GEnx size aircraft engine of 111 inch (282 cm) tip to tip fan diameter if the vacant volume about its forward bearing is occupied by the reversed PMEG(s) of the present invention. The sample calculation is made assuming a reversed PMEG of radial magnetic flux type. There are other PMEG configurations which produce greater PMEG specific power levels then the radial magnetic flux machines used in hybrid automobiles and selected for the example calculation. The other type of PMEG is known as an axial magnetic flux machine. However, sufficient experimental measurements are not available on axial magnetic flux machines in comparison with those measured by ONRL on radial magnetic flux PMEGs to substitute an axial magnetic flux reversed PMEG machine in the sample calculation. In using measured hybrid automobile data from ONRL for a radial magnetic flux machine in the sample calculation, it should be realized that much improved results can be achieved by changing from a radial magnetic flux reversed PMEG machine to an axial magnetic flux reversed PMEG, typically a factor of two better. The sample calculation contained later in this patent application is included to illustrate that the present invention can supply significant amounts of electricity in confined engine space to accomplish the deicing.

A turbofan engine with the size of the GEnx engine is selected for the example calculation of the amount of reversed PMEG generated electric power that can be generated since it is the turbofan engine currently experiencing the most inflight high altitude icing problems. Also, it should be noted that using the ORNL measured values in the example calculation provides an underestimate of the amount of electricity produced by the reversed PMEG of the present invention. First, because the reversed PMEG of the present invention is operating as a generator and not as a motor. Second, because a reversed PMEG designed today will be improved in comparison with earlier PMEGs studied by Oak Ridge National Laboratory (ORNL) for any new reversed PMEG of the present invention will also take advantage in the new design of the detailed experimental measurements conducted by ORNL. Also, it should be noted that an axial magnetic flux machine of reversed PMEG type, if substituted for the radial magnetic flux reversed PMEG machine considered in the example calculation, would demonstrate improved generation capability, typically a factor of two better.

Prior art fan blades, presently in use in high bypass turbofan aircraft engines, are constructed of several materials: titanium metals or high strength carbon fiber composite materials. Rolls Royce engines have employed titanium fan blades for the past 40 years and are presently transitioning to composite blades while GE engines have used composite blades with a titanium leading edge strength member added for durability since 1995. Prior art composite fan blades are manufactured by several different methods and all involve carbon fibers and/or carbon yarns combined with plastic resins including epoxies. The form of the prior art fan blades achieved by laying up layers of resin impregnated carbon fibers in a mold or by weaving the carbon fiber together to form the desired shape and then curing the resin impregnated layers together by subjecting the finished blade to air curing or to vacuum bagged and/or autoclave curing depending on the type of resin employed. Typically the binding resin is a thermoset resin such as epoxy or a thermoplastic one. In some curing approaches, the finished fan blade is exposed to a combination of pressure and heat for final cure.

In the present invention, electricity from the reversed PMEG is used to heat many engine parts including the structure comprising the engine spinner of the turbofan engine. This is accomplished by embedding electric heating elements directly into the engine spinner structure or by attaching electric heating cables or heating pads to the interior surface of the nose spinner. The preferred embodiment for heating the engine spinner being the latter type. Attachment of heating elements in the form of heating cables or heating pads to the interior surfaces of the structure supporting the low pressure compressor being the preferred approach for heating it. The interior conical shape of the nose spinner, the interior shape of the nearly barrel like compressor case and the structure supporting the low pressure compressor, offering surfaces to which heating cables or heating pads can be easily attached.

In the present invention, heating of prior art type fan blades with electricity from the reversed PMEG(s) represents a greater challenge than that of heating the engine spinner, the barrel shaped compressor case structure and the structure supporting the low pressure compressor and a unique way to accomplish it is offered here. Heating of prior art type titanium fan blades is accomplished in one example of the present invention by adding conductive coatings along the fan blade's leading and trailing edges to form electrodes with resistive material coatings added which fill the surface area between these electrodes. Electrical power from the ETDS is supplied to the leading edge electrode with the trailing edge electrode acting as the electrical ground. As the electricity flows from the leading edge electrode thru the resistive coating to the ground electrode, the intermediate resistive material between the two electrodes is heated and the heat so generated melts any ice.

The present invention also offers a unique method whereby electricity from the ETDS is used to heat prior art fan blades constructed from composite materials which is a much greater challenge than that of heating metal fan blades. The prior art composite fan blade with leading edge strength member is modified as follows so that it may be heated by the ETDS of the present invention. In the new approach, the existing leading edge strength member is modified by coating it with an electrically conductive material to transform it into an electric electrode or turn it into an electric electrode by attaching a thin layer of conductive material to the leading edge strength member. A new conductive trailing edge member is added to the composite fan blade to form a second electric electrode. Finally, resistive material is attached between the forward and rear electrodes. The electrodes and resistive material being embedded within the composite fan blade when the fan blade is manufactured. Again, electric power from the ETDS is supplied to the leading edge electrode with the trailing edge electrode acting as the electrical ground. As the electricity passes from the leading edge electrode thru the resistive material to the ground electrode, the resistive material between the two electrodes is heated and the heat so generated heats the fan blade and melts any ice.

The resistive material which acts electrically between the two electrodes to heat the composite fan blade is achieved by a variety of methods in the present invention. Since the technology exists to coat single carbon fibers with electrically conducting materials, such fibers may be combined together to form conductive carbon cables and/or resistive heating pads which are embedded in the composite fan blades and attached between the two electrodes. Resistance heating is generated in the embedded resistive cables and/or resistive heating pads with electric power from the ETDS heating the fan blade and melting any ice on its surface.

Another technique that forms the basis of a method to heat the composite fan blades of the present invention employs technology previously developed to protect aircraft that are constructed from carbon fiber composite material from lightning strikes such as Boeing's 787 aircraft. Designs have been studied and experimentally tested where electrically conductive wire screens or thin metal sheets are embedded in composite carbon materials which can form fuselage and wing parts with the objective that these electrically conductive materials provide a path which allows the lightning strike to move along the surface of the fuselage or wing before discharging from the aircraft without damaging it. Such means to protect composite carbon materials being at a mature state now. Had a wire screen material, thin metal sheet material or other conductive material not been embedded within the composite material, the lightning bolt would have entered the composite material at the point where the lightning bolt strikes the aircraft causing severe damage to the aircraft. The fan blades of the present invention may also employ these well developed and well tested techniques for embedding conductive materials in carbon fiber composite material with characteristics of the wire mesh or thin metal sheet materials or other conductive implementation now chosen on the basis of having a desired value of resistance to generate heat when ETDS power is applied to the fan blade.

There is another mature technology that is also available and can be used as the basis to heat the fan blades of a turbofan engine. Originally, radiant carbon film material was developed to heat the floors of residences. As originally used, the film was installed under the floor of a residence and heated electrically. For the present invention, such a film is embedded in the fan blade, attached between the leading edge electrode and the trailing edge electrode, and used to generate heat to melt surface ice. In the residential application, the film can operate up to temperatures of 200 degrees F. which is ample for use in the heated fan blade of the present application. Of the many techniques mentioned above and available to heat the turbofan engine fan blades of the present application, the use of embedded conductive wire or thin metal sheet material is the simplest approach and is the preferred embodiment.

The present invention is unique in its use of a reversed PMEG to deice the aircraft's turbofan engine. It utilizes rotating generator windings and stationary permanent magnets in comparison to conventional PMEGs where the permanent magnets are rotating and the generator windings are fixed. It is also unique in that all electrical power generated by the reversed PMEG of the present invention is supplied to rotating parts of the engine where icing occurs and where electricity is converted to heat for the melting of any deposited ice. The present invention is also unique because the entire ETDS is stored within internal volumes of the turbofan engine which are now empty and unused but available to house the ETDS. The present invention is unique in that all of the related ETDS equipment is stored within an envelope containing the engine's rotating parts and that the electric power that it produces is connected directly to the adjacent rotating engine parts requiring electricity for deicing. The present invention is unique in that it heats prior art fan blades constructed of metal or composite materials as well as those prior art composite fan blades constructed with titanium and stainless steel leading edge strength members.

The features and advantages described herein are not all inclusive and, in particular, many additional features and advantages will be apparent to one of ordinary skill in the art in view of the drawings, specifications, and claims. Moreover, it should be noted that the language used in the specifications has been principally selected for readability and instructional purposes, and not to limit the scope of the inventive subject matter.

BRIEF DESCRIPTION OF THE DRAWINGS

FIG. 4 A-4 B are side view and front view drawings of a prior art conventional PMEG with rotating permanent magnets and stationary generator windings.

FIG. 5 A-5 B are side view and front view drawings of a reversed PMEG of the present invention with stationary permanent magnets and rotating generator windings.

DETAILED DESCRIPTION

Figure 1:
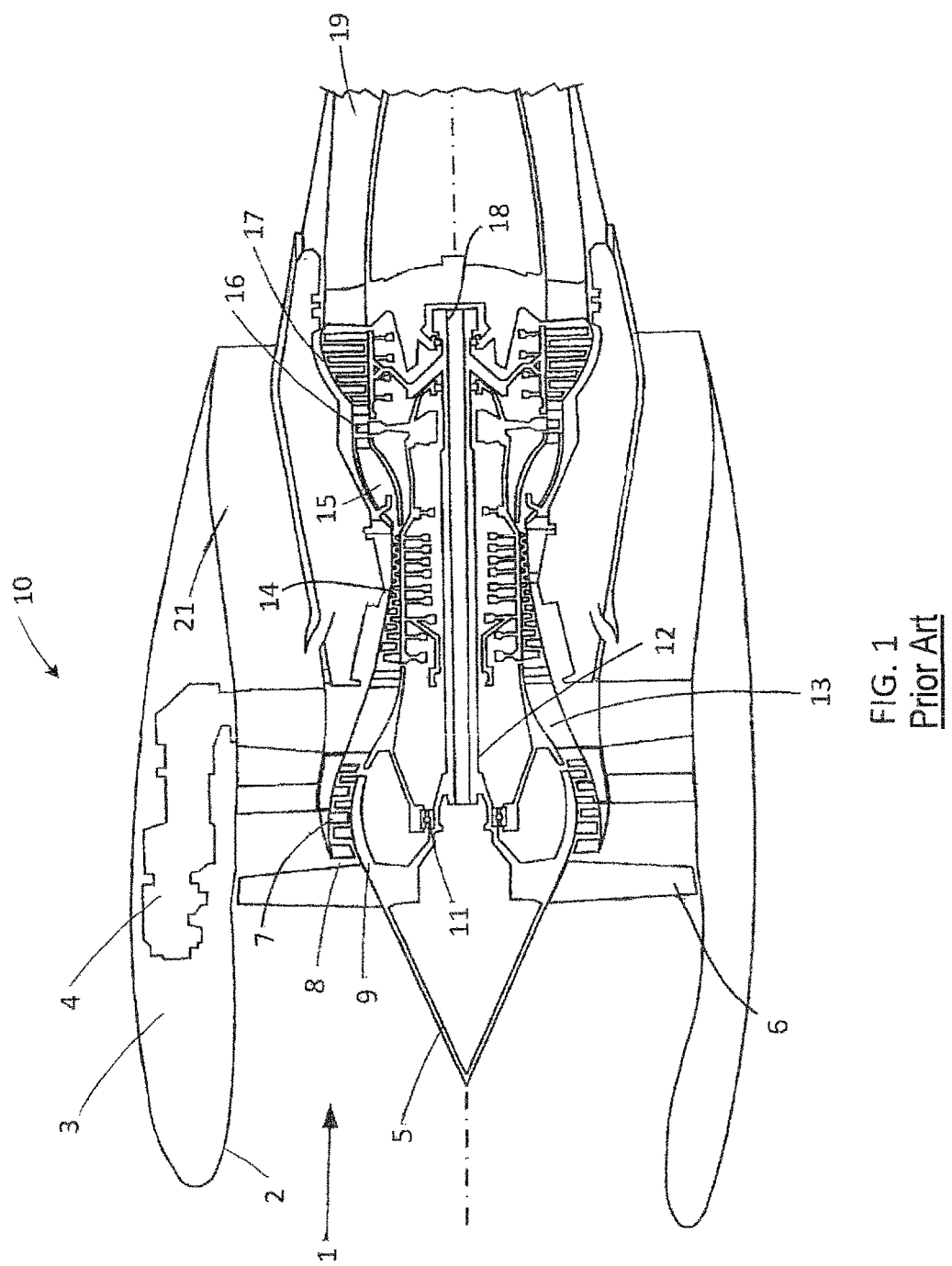
FIG. 1 is a cross-sectional drawing of a typical prior art turbofan aircraft engine of high bypass ratio.

A cross-sectional diagram of a typical prior art turbofan aircraft engine of high bypass ratio 10 is provided in FIG. 1. Features of the typical prior art turbofan engine shown in FIG. 1, 10, starting at the inlet entrance and continuing to the exhaust end, include: inlet air flow, 1, inlet entrance duct, 2, nacelle, 3, aircraft/engine structural support, 4, engine spinner, 5, engine fan blades, 6, low pressure compressor, 7, low pressure compressor air inlet, 8, low pressure compressor casing, 9, forward bearing, 11, central drive shaft, 12, low pressure compressed air duct, 13, high pressure compressor, 14, combustion chamber, 15, high pressure turbine, 16, low pressure turbine, 17, aft bearing, 18, combustor exhaust duct, 19, and bypass air duct, 21. When icing is occurring inside a high bypass ratio turbofan engine at high altitudes near tropical storms, the ice attaches itself to internal exposed surfaces including the rotating engine spinner, 5, rotating engine fan blades, 6, low pressure compressor casing and rotating low pressure compressor, 9, and as well as the fixed low pressure compressor air inlet, 8, and downstream surfaces of the low pressure compressed air duct 13.

The forward portion of the typical prior art turbofan aircraft engine of high bypass ratio, where icing is expected, is shown in FIG. 1, 10. This forward portion contains the following elements: rotating engine spinner, 5, rotating engine fan blades, 6, rotating low pressure compressor casing, 9, rotating central drive shaft, 12, and rotating low pressure compressor, 7: all driven by the downstream low pressure turbine. All other elements in the same forward section of the engine are non-rotating and fixed in place with respect to the aircraft. The forward bearing, 11 is supported in place by diagonal structural elements attached between the bearing and the outer non-rotating low pressure compressed air duct.

The geometry shown in FIG. 1, 10 is that of a typical high bypass ratio turbofan aircraft engine, of the type presently supplied on commercial aircraft manufactured by Boeing and Airbus companies, with a bypass ratio near 10. Bypass ratio being defined as the ratio of amount of air passing thru the engine not involved in the combustion process to the amount of air passing thru the engine's combustors. Internal icing of the turbofan aircraft engine, which the present invention eliminates using electric heat provided by one or more internal reversed PMEGs, include ice deposits on the exterior surfaces of the engine spinner, 5, ice deposits on the exterior surfaces of the engine fan blades, 6, ice deposits on the exterior surface of the low pressure compressor casing, 9, ice deposits on the interior portion of the low pressure compressor, and ice deposits on inner walls of the low pressure compressed air duct, 13. Internal ice deposits, other than these, are not expected.

The reversed PMEG and associated equipment of the Embedded Turbofan Deicer System (ETDS) of the present invention are installed internally in the aircraft's turbofan engine within engine spaces vacant and not presently utilized. Installation of the ETDS of the present invention requires no redesign of the existing engine geometry. As noted in FIG. 2, 20, one available space for installation of a portion of the ETDS includes the interior of the engine spinner, 24. This space is used to house some or all of the ETDS's associated equipment including the instrumentation subsystem, control subsystem, and electric switching subsystem. In one approach, all of the reversed PMEGs of the present invention fill the two volumes: Volume A, 22 and Volume B, 23. Volume A, 22, lies above the central drive shaft and behind the forward bearing and is bounded on its inner diameter by the engine's rotating central drive shaft, 27, and on its outer diameter by the stationary forward bearing structural support beams, 25. Volume B, 23, lies above the forward bearing and is bounded on its inner diameter by the stationary forward bearing structural support beams, 25, and on its outer diameter by the inner surface of the rotating low pressure compressor casing, 26. These volumes are available to house the reversed PMEGs in their interiors.

Both Volume A, 22 and Volume B, 23 are circular symmetric volumes about the engine's central drive shaft. For the following calculation for the electric power requirements for deicing, assuming the engine geometry shown in FIG. 1, 10, and with the turbofan engine's fan blade diameter at 111 inches (282 cm), equivalent to that of a full scale GEnx engine, Volume A, 22 is calculated to be 10.4 cubic feet (0.028 cubic meters) based on scaling dimensions from FIG. 1, 10.

The amount of heat and equivalent electric power needed to melt the portion of ice crystals ingested into a turbofan engine and not bypassed through it but passing into the engine's combustion circuit can be calculated when the aircraft's flight conditions, the loading of ice crystals in the atmosphere, the atmosphere's ambient temperature, diameter of the engine's fan blades, and engine's bypass ratio are known. For an aircraft cruising at M=0.82 and 38,000 feet, with an example atmospheric ice crystal loading of 1 gram per cubic meter, an atmospheric temperature of −69.7 F (−56.5 C), and having an engine with fan blade diameter of 111 inches (282 cm) and a bypass ratio of 10, the amount of heat required to deice the ice crystals in the combustor circuit is calculated in two parts. One part is the heat (electric power) needed to raise the ice crystals from −67.7 F to 32 F, (−56.5 C to 0 C) without melting them (the specific heat part). The second part is the heat (electric power) needed to melt the ice at 32 F (0 C) to water at 32 F (0 C) (the heat of fusion part).

For a 1 gram per cubic meter ice crystal loading, 60.4 kJ/sec (kW sec/sec=kW) of heat is found to be required to melt the ice crystals. If a reversed PMEG of radial magnetic flux type with Lexus automobile motor volume density of 6.59 kW/L (186 kW/ft$^3$) and a 2.46 kW/kg (167 lbs/ft$^3$) specific power density is then chosen for the example calculation, the corresponding volume occupied by the reversed PMEG is 0.32 ft$^3$ and its weight is 54.2 pounds (24.61 kg). At 1 gram per cubic meter loading, the volume occupied by the reversed PMEG is only 3.1% of the 10.4 cubic feet volume available in Volume A, 22, of a GEnx sized turbofan engine.

For the ice crystal loadings of interest, ranging from 3 grams per cubic meter to 9 grams per cubic meter, the heat required for deicing at 3 grams per cubic meter ice crystal loading is 181 kJ/sec (kW), the volume occupied by the reversed PMEG is 0.96 ft$^3$, its weight 163 pounds and occupying 9.3% of the available Volume A, 22 while at 9 grams per cubic meter ice crystal loading, 489 kJ/sec (kW) of heat is required, the volume occupied by the reversed PMEG is 2.9 ft$^3$, its weight 487 pounds and occupying 27.9% of Volume A. From these results, it can be seen that the required electric power for deicing, over the range of ice crystal loading of interest, can be generated by a radial magnetic flux reversed PMEG utilizing only a small portion of Volume A, 22, and having a reasonable weight. Further, a switch from a radial magnetic flux reversed PMEG to an axial magnetic flux reversed PMEG implies further reductions in volume requirements and reduced generator weights by at least a factor of two more. The results also indicate that Volume B, 23 is not needed to house the reversed PMEG and is available to house other parts of the ETDS.

If Volume A, 22 is partially filled with reversed PMEGs and Volume B, 23, of the present invention is not needed for storage of reversed PMEGs and is empty, the electric switches of the electric switching subsystem can be mounted within the remaining free volume in Volume A, 22 and in Volume B, 23 rather than in the engine spinner. The advantage of this arrangement is that it reduces the lengths of heavier electric cabling used between the reversed PMEG generators and thence to the electric switches and back to the heating elements in comparison to a design which has filled Volume A, 22 completely with reversed PMEGs. If Volume A, 22 is completely filled with reversed PMEGs, it would have required that the heavier electric cabling run first from the reversed PMEGs in Volume A, 22, and Volume B, 23 (if used), to electric switches in the engine spinner and thence back to the heating elements.

Figure 3:
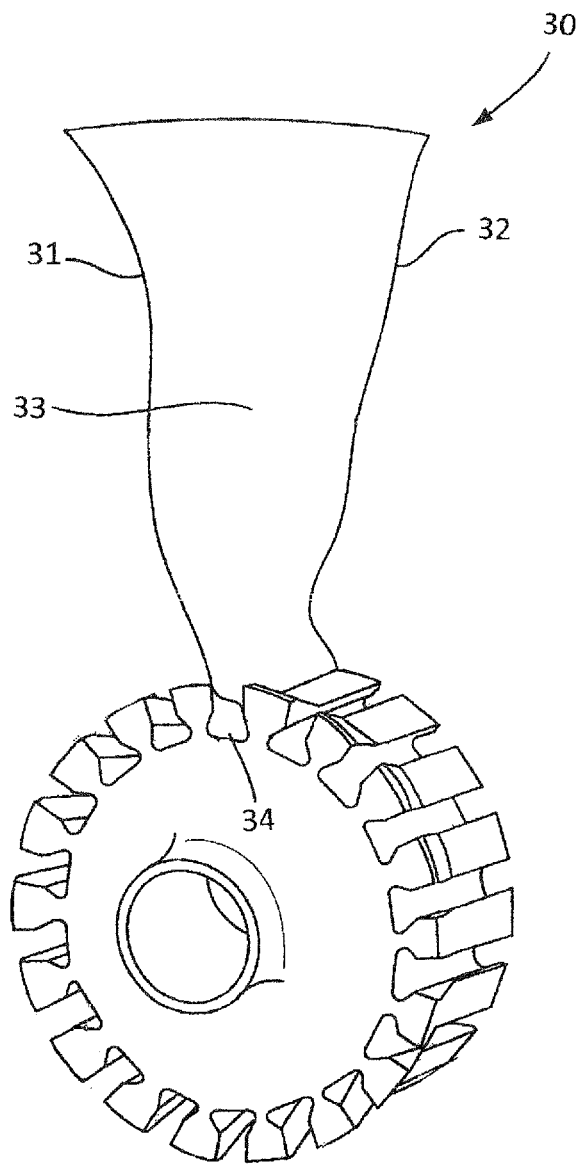
FIG. 3 is a drawing of a prior art turbofan engine fan blade and hub viewed from a forward oblique angle.

A drawing illustrating the shape of a prior art fan blade, as viewed from a forward oblique location, is provided in FIG. 3, 30. Prior art metal fan blades as well as prior art composite fan blades being of this shape with a leading edge, 31, a trailing edge, 32, and a main body of the fan blade, 33. The fan blades are mounted, as shown in FIG. 3, 30, in slots, 34, in a hub of the blade with the hub, in turn, attached (not shown) to the central drive shaft of the turbofan engine. Prior art composite fan blades also have a leading edge strength member in their leading edges (not shown).

The reversed PMEG of the present invention differs in principal from what is normally known as a conventional PMEG. As noted in drawings FIG. 4 A, 40 and FIG. 4 B, 40, a conventional PMEG has a central rotor with magnets, 42, which is externally driven thru a shaft, 43, with the rotor rotating within stationary generator windings, 41. The electricity produced by the conventional PMEG used by stationary equipment adjacent to and electrically attached to the conventional PMEG. This is the type of PMEG used in hybrid automobile applications where the automobile drive shaft is horizontal and a vertically mounted single disc PMEG of pancake shape is the preferred geometry for that application.

The reversed PMEG of the present invention differs from a conventional PMEG and a layout of it is provided in FIG. 5 A, 50, and FIG. 5 B, 50, which illustrates that stationary and rotating parts are reversed from those used in a conventional PMEG. In the reversed PMEG of the present invention, a fixed stator with magnets, 52 is located in the center of rotating generator windings, 51, with the electric power generated by the reversed PMEG supplied to equipment rotating along with the generator windings. In the present invention, the engine spinner, engine fan blades, low pressure compressor casing and low pressure compressor are rotating and heated by the rotating reversed PMEG of the present invention. Since the turbofan aircraft engine has a horizontal central drive shaft and available volumes for installation of the PMEG of the ETDS are radially disposed to the central drive shaft as shown in FIG. 2, 20, a vertically mounted pancake shaped reversed PMEG is considered in more detail for use in the example for the present invention.

Figure 2:
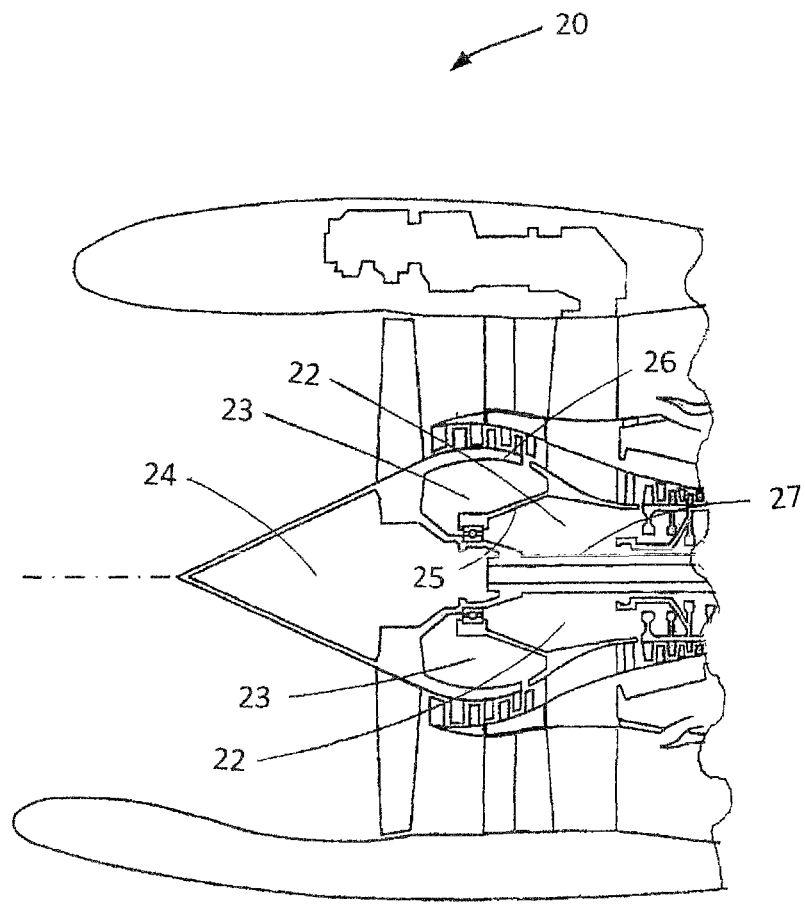
FIG. 2 is a cross-sectional drawing of the forward portion of a typical prior art turbofan aircraft engine which illustrates unused volumes in the engine where the reversed PMEG of the present invention is installed.
Figure 6:
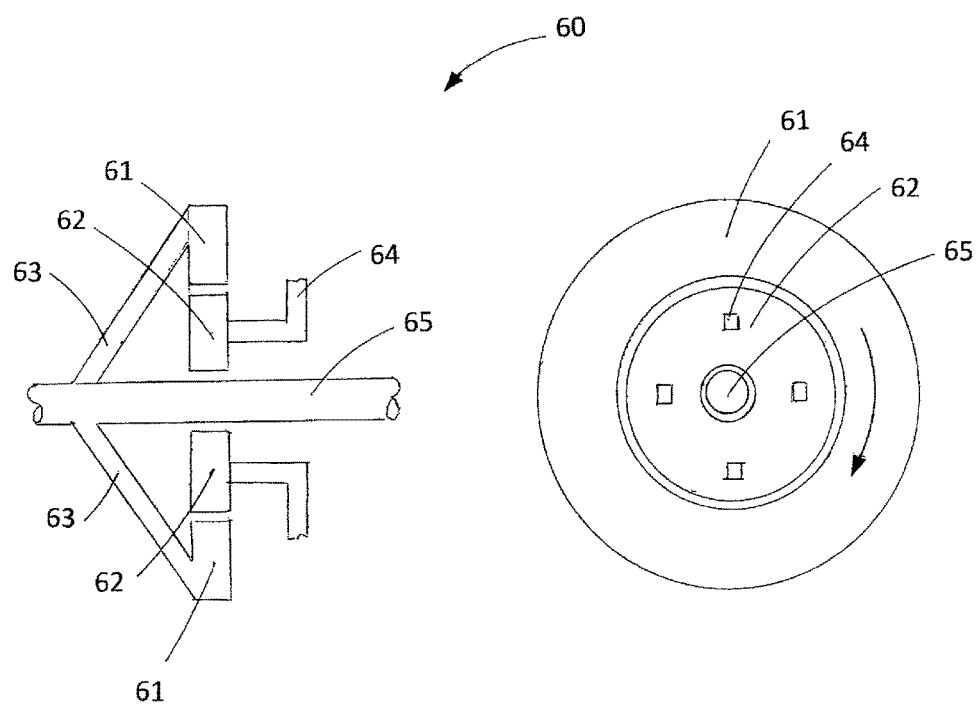
FIG. 6 A-6 B are side view and front view drawings of a radial magnetic flux reversed PMEG of the present invention designed to be mounted in the unused Volume A, FIG. 2 with windings attached to the engine's central drive shaft.

A drawing of a single reversed PMEG of the present invention, designed to be mounted in Volume A, 22 of FIG. 2, is provided in FIG. 6, 60. It should be noted that multiple adjacent electrically connected radial magnetic flux reversed PMEGs of the present invention may be combined to form a more powerful reversed PMEG electric generator, if desired. Also, single and multiple more efficient axial magnetic flux reversed PMEGs may be substituted for the example single radial magnetic flux reversed PMEG shown in FIG. 6, 60. The more efficient axial magnetic flux reversed PMEG employing several rotating generator windings combined with a single stationary magnetic disc to form a sandwich PMEG.

The example reversed PMEG of the present invention, shown in FIG. 6 A and FIG. 6 B, 60, is for installation in Volume A, 22, of FIG. 2, 20. It has its stator with magnets, 62, attached (not shown) to the downstream stationary portion of the compressed air duct and its generator windings, 61, attached to the rotating central drive shaft, 65, via structural supports, 63: the central drive shaft, 65, passing thru the center of the stator with magnets, 62.

To install a reversed PMEG of the present invention in volume B, 23, of FIG. 2, if desired, a different support arrangement (not shown) is used for the stator with magnets, 62, and the rotating generator windings, 64. In that case, the stator with magnets, 62, is attached to the outside of the fixed forward bearing structural support beams forming the lower surface of Volume B, and the rotating generator windings are attached to the inside of rotating low pressure compressor casing, 9, FIG. 1.

Figure 7:
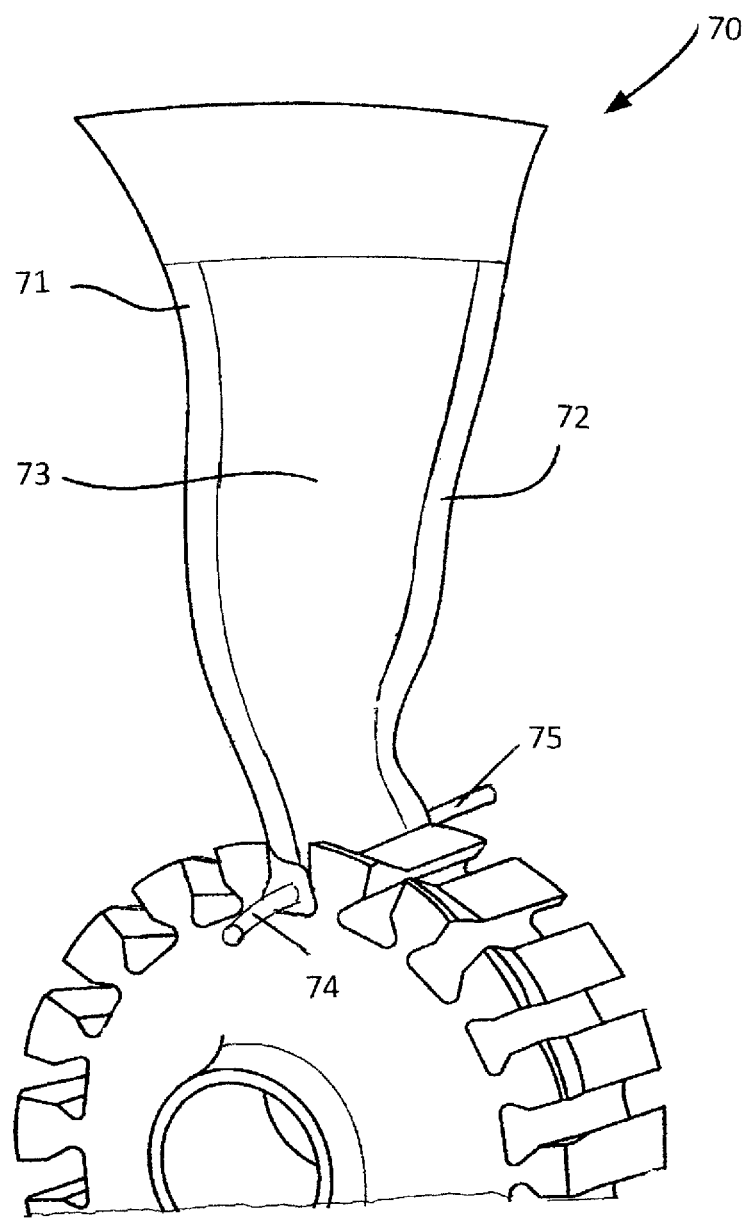
FIG. 7 is an oblique drawing of a metal fan blade modified for the present invention with surface mounted conducting electrodes and resistive materials to form a fan blade heater.

The present invention uses electric heat to melt ice forming on turbofan engine fan blades of metal material or composite material. Metal fan blades for the present invention, FIG. 7, 70, are modified from prior art metal fan blades by adding an electrically conducting electrode, 71, along the blade's leading edge, a second electrically conductive electrode, 72 along the blade's trailing edge, 72, and electrical resistive material, 73, between the two electrodes. Electrical power from the reversed PMEGs of the present invention is distributed to the modified fan blade of the present invention thru attached cable 74. The electricity is then conducted from the leading edge electrode, 71, to the trailing edge electrode, 72, thru the electrically resistive material, 73, thus raising the temperature of that material and the temperature of the surrounding material by conduction. The temperature rise in both materials preventing icing. The electric heating circuit is then grounded to the airframe via cable, 75.

On a prior art titanium fan blade, the leading edge electrode, 71, of the present invention is formed by adding a conductive coating on the titanium leading edge surface. The trailing edge electrode, 72, and the resistive surface material, 73, between the electrodes also accomplished by adding metal coatings to the blade's surface: the metal coatings forming electrodes, 71, and 72, and that forming the resistive coating, 73 having different electric conductivities.

Figure 8:
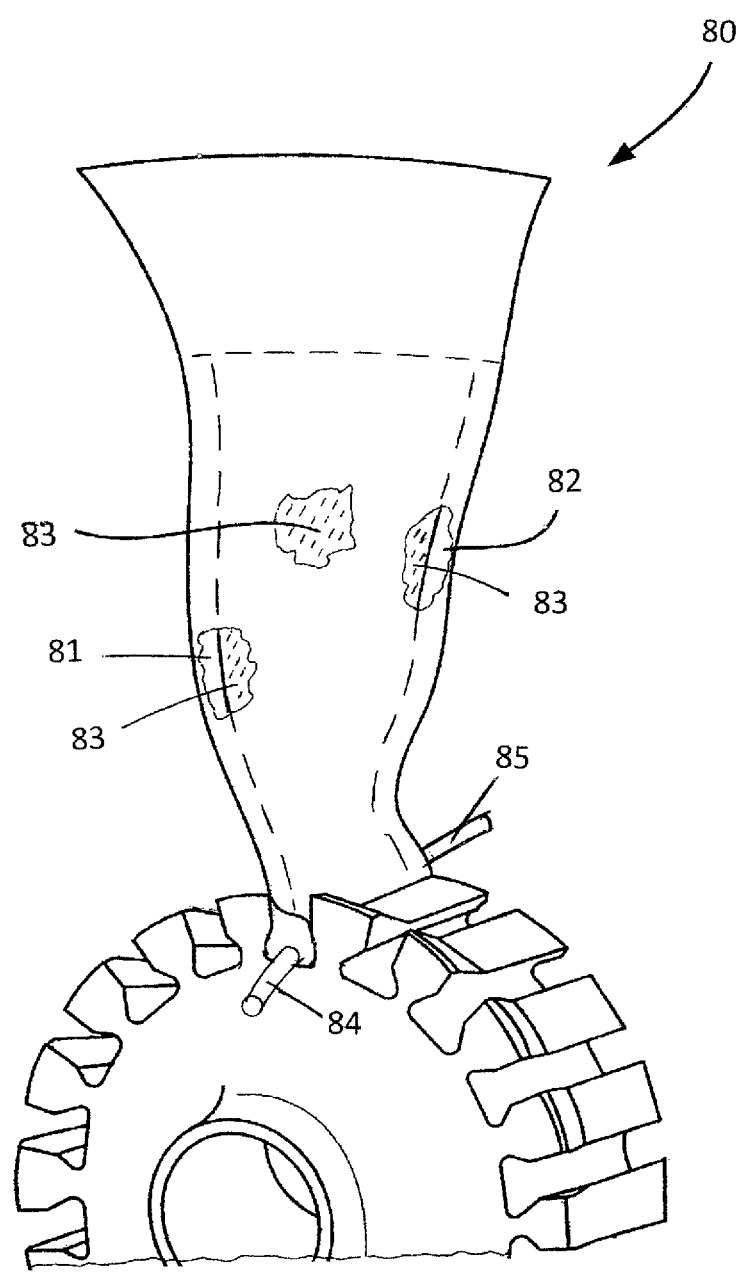
FIG. 8 is an oblique drawing of a composite and metal/composite fan blade modified for the present invention with embedded conducting electrodes and resistive materials to form a fan blade heater.

To convert a prior art composite fan blade strengthened with a titanium or stainless steel leading edge, FIG. 8, 80, to a modified fan blade capable of being heated by the reversed PMEG of the present invention, a conductive metal coating is added to the embedded leading edge titanium or stainless steel strength member, 81, and a second conductive metal electrode, 82, is added and embedded at the trailing edge of the fan blade. For both modified fan blade designs, metal or composite, the leading edge electrode is electrically attached to the PMEG and the trailing edge electrode is attached to an airframe ground. In the modified composite fan blade case, FIG. 8, 80, the electricity enters the fan blade thru cable, 84, passes thru electrode, 81, then thru resistive coating, 83, then thru electrode, 82, and exits thru cable, 85, to the airframe ground. In the present invention, the electric ground is realized (not shown) by running a grounding cable from the fan blade, thru the hollow center of the engine's central drive shaft (or attached to its outside circumference) to a location aft of the rear bearing of the engine's central drive shaft. The ground is then completed between the rotating engine's central drive shaft and the adjacent stationary airframe by slip rings or by an apparatus employing conductive liquid or conductive ball bearings. Running the ground thru the hollow center of the engine's drive shaft is the preferred embodiment for the present invention.

To heat the modified prior art composite fan blade, the embedded resistive material, 83, between the two embedded electrodes, 81, and 82, is incorporated in one of a variety of ways. Embedded resistive materials include metal mesh, expanded foil and other approaches previously developed and proven as lightning strike protection for composite materials in aircraft and adapted to the present invention by tailoring them to have the proper value of resistance for the heating application. Other candidate resistive materials are those formed with epoxy compounds of desired resistivity or by the addition of resistive film. Candidate resistive films include films previously developed and used as a radiant underlayment floor heating film in residential construction.

Figure 9:
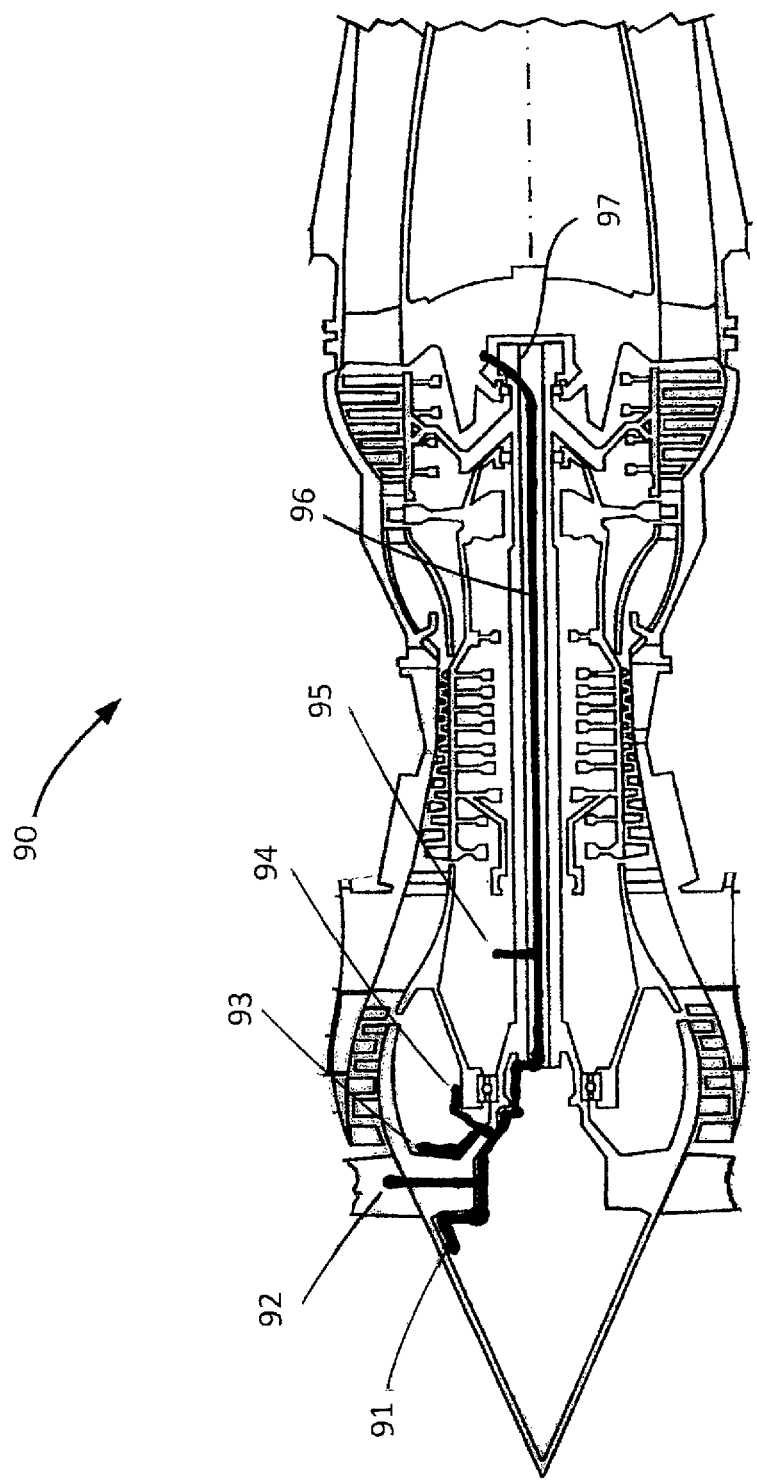
FIG. 9 is a side view drawing of the route followed by the electric cables of the embedded turbofan deicer system.

An example of the route followed by electric cables of the ETDS system, added to a prior art turbofan engine to form the ETDS deice system of the present invention, is provided in FIG. 9, 90. A single highlighted route is shown for clarity with pieces of equipment to which the cable is attached omitted also for clarity. Origins and/or destinations for the cabling include the engine spinner, 91, fan blades, 92, low pressure compressor casing and low pressure compressor, 93, primary set of PMEGs, 94, secondary set of PMEGs, 95, (if used), grounding cable, 96 and PMEG to airframe ground, 97. In this illustration, a single highlighted route is shown but the actual cable includes portions provided to route electric power from the reversed PMEG, detect icing, make turbofan engine temperature measurements, control ETDS operation, heat various elements of the engine and ground the ETDS deicer system. The overall system cable following this route is constructed from a number of smaller diameter cables of different lengths and different functions. The route shown in FIG. 9, 90, is for a single fan blade. It is repeated (not shown) for other fan blades making up the multiple fan blade section.

The example cable route depicted in FIG. 9, 90, is shown for the case that the engine spinner, 91, contains the STED control subsystem, readout portions of the instrumentation subsystem, STED electric switches, electric terminals for PMEG electric power and electric redistribution network, electric power converters (if used) and engine spinner resistance heating elements. At the fan blade junction, 92, cables are attached to the fan blade which read temperatures and ice detection data and provide electric power for heating the resistive elements on or embedded in the fan blades. At the compressor and compressor casing junction, 93, cables are attached which read temperatures and ice detection data and provide electric power for heating the resistive elements on or embedded in the low pressure compressor casing and low pressure compressor. At junction, 91, incoming temperature and ice detection cables are attached to the control subsystem within the engine spinner and switched electric power is relayed to heating elements on engine spinner, fan blades and low pressure compressor casing and low pressure compressor. At junctions, 94 and 95, the reversed PMEGs of the present invention are attached to the systems electric distribution cable.

Figure 10:
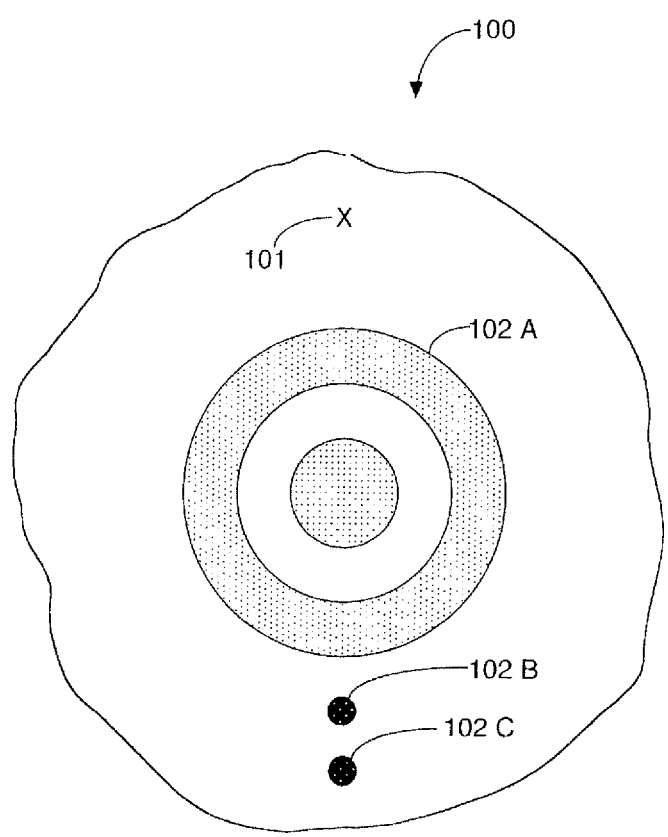
FIG. 10 is a plan view drawing of temperature and ice detection sensors of the present invention installed on engine spinner, fan blades, low pressure compressor casing and low pressure compressor surfaces exposed to ice crystal icing.

The manner in which temperature and ice detection sensors are installed at various locations on the engine spinner, fan blades and compressor and compressor casing is shown in FIG. 10, 100. The thermocouple sensors, 101, are placed at various locations on the surfaces of and also submerged within the engine spinner, fan blades, low pressure compressor casing and low pressure compressor and with measured temperature data relayed back to the temperature receiver and thence to the ETDS control subsystem. Simultaneously, the status of icing on the exterior surfaces of rotating engine parts is measured by ice detection sensors comprised by a combination of electric impedance sensor part, 102 A, a self-heated thermistor part, 102 B, and a temperature measuring thermistor, 102 C, as described in U.S. Pat. No. 7,439,877, with the measured data also relayed back to the ice detection receiver and thence to the ETDS control subsystem. In the control subsystem, both types of data are analyzed and used to control the amount of electricity and thus the amount of heat supplied for deicing engine parts. The three pieces, 102 A, 102 B, and 102 C comprising the overall ice detection sensor are mounted in close proximity to each other and exposed on the surfaces upon which they are mounted while the thermocouple temperature sensors, 101, are mounted at various positions on engine parts to be monitored.

Figure 11:
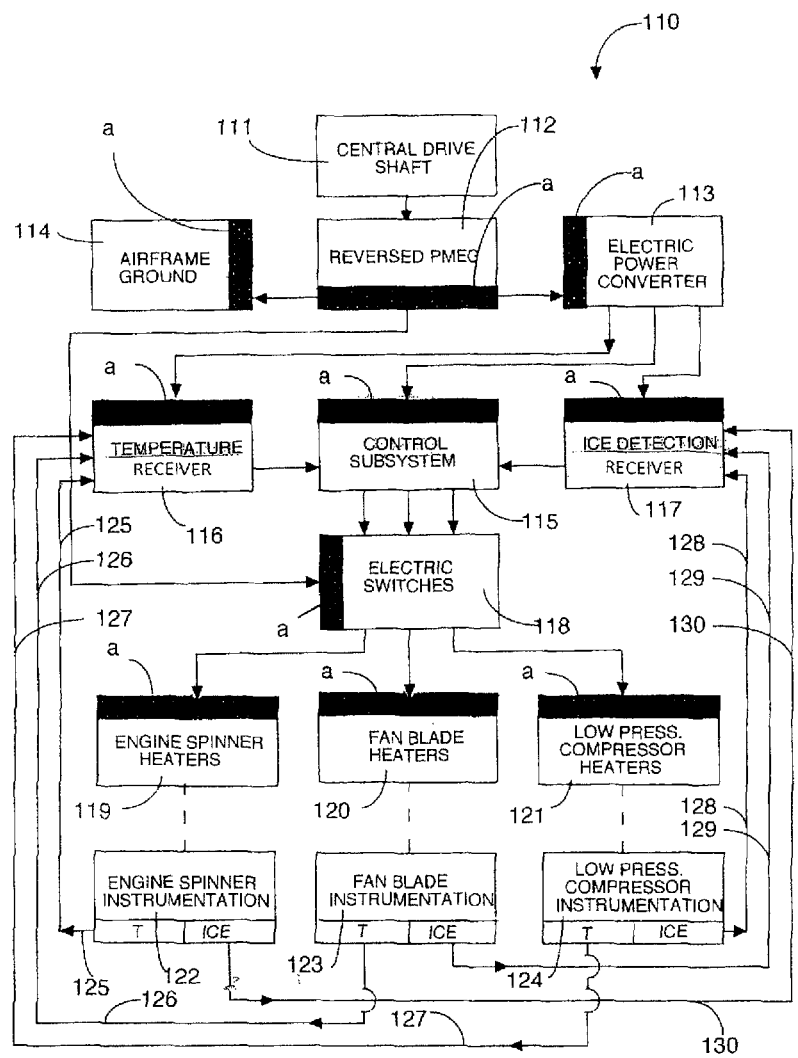
FIG. 11 is a block diagram of the subsystems comprising the present invention and how they are connected.

A block diagram of the ETDS system is provided in FIG. 11, 110, and shows the engine's central drive shaft, 111, driving the reversed PMEG of the present invention to produce the electric power used to deice engine parts subjected to ice crystal icing. A portion of the electric power generated by the PMEG is then provided to electric switches, 118, and a portion to the electric power converter, 113. Each element receiving electric power directly from the reversed PMEG and the ground, 114 between the reversed PMEG, 112 and the airframe, are all shaded with a black area and marked with letter a to note their receipt of electric power The portion of electric power from the reversed PMEG, 112, to the electric power converter, 113, is then conditioned as required to power the operation of the temperature receiver, 116, control subsystem, 115, and ice detection receiver, 117. Based on information received by the control subsystem, 115, from the temperature receiver, 116, and the ice detection receiver, 117, the control subsystem actuates or deactivates electric switches in the electric switch unit, 118, to supply electric power to engine spinner heaters, 119, fan blade heaters, 120, and low pressure compressor casing and low pressure compressor heaters, 121. Separately, temperature and ice detection instrumentation in the engine spinner, 122, fan blades, 123, pressure compressor casing and low pressure compressor, take measurements and relay them to the control subsystem, 115, via the temperature receiver, 116, and via the ice detection receiver, 117. The temperature sensor measurements from the engine spinner, fan blades, low pressure compressor casing and low pressure compressor are carried to the temperature receiver via cables, 125, 126, and 127, respectively. The ice detection measurements from the engine spinner, fan blades, low pressure compressor casing and low pressure compressor and are carried back to the ice detection receiver via cables, 128, 129, and 130, respectively. Electrical connections (not shown) between the ETDS, installed in the engine, and the cockpit allow the pilots to manually turn the ETDS on or off should they wish to do so or in response to an emergency arising in the ETDS during its operation.

The forgoing description of the embodiments of the invention has been presented for the purposes of illustration and description. It is not intended to be exhaustive or to limit the invention to the precise form disclosed. Many modifications and variations are possible in the light of this disclosure. It is intended that the scope of the invention be limited not by this detailed description but rather by the claims appended hereto.

What is claimed is:

1. An air-breathing jet engine comprising:
    at least one rotatable shaft; and
    a deicing apparatus, comprising:
        a reversed permanent magnet electric generator (PMEG) driven by the at least one rotatable shaft, wherein the reversed PMEG has at least one fixed magnet and at least one rotatable winding;
        an electrical resistive thermal material positioned on at least a portion of the air-breathing jet engine;
        at least one electrical ground connection connected between the at least one rotatable winding and an aircraft airframe; and
        at least one electrical connection between the reversed PMEG and the electrical resistive thermal material.

2. The air-breathing jet engine of claim 1, wherein the reversed PMEG is positioned within an interior space in the nose-end of the air-breathing jet engine between the at least one rotatable shaft and a rotatable low pressure compressor casing of the air-breathing jet engine.

3. The air-breathing jet engine of claim 1, wherein the reversed PMEG further comprises a stator having the at least one fixed magnet, wherein the at least one rotatable winding is positioned exterior of the stator.

4. The air-breathing jet engine of claim 3, wherein the at least one rotatable winding is connected to the at least one rotatable shaft of the air-breathing jet engine.

5. The air-breathing jet engine of claim 3, wherein the at least one rotatable winding is connected to a rotatable low-pressure compressor casing of the air-breathing jet engine.

6. The air-breathing jet engine of claim 3, wherein the stator is affixed to a non-rotatable casing of a forward bearing of the air-breathing jet engine.

7. The air-breathing jet engine of claim 1, wherein the at least one electrical connection further comprises:
    a first electrode positioned on a leading edge of a fan blade of the air-breathing jet engine; and
    a second electrode positioned on a trailing edge of the fan blade, wherein the electrical resistive thermal material is positioned between the leading edge and the trailing edge.

8. The air-breathing jet engine of claim 7, wherein at least one of the first and second electrodes further comprises a conductive coating formed on the fan blade.

9. The air-breathing jet engine of claim 7, wherein at least one of the first and second electrodes further comprises a conductive coating formed at least partially within the fan blade.

10. The air-breathing jet engine of claim 7, wherein the at least one electrical connection further comprises at least one electrical cable positioned through the fan blade.

11. The air-breathing jet engine of claim 1, wherein the at least one electrical ground connection has at least one grounding cable positioned at least partially through a hollow center of the at least one rotatable shaft.

12. The air-breathing jet engine of claim 1, further comprising at least one of a temperature sensor and an ice detection sensor positioned on the air-breathing jet engine.

13. The air-breathing jet engine of claim 12, further comprising a control system interfaced with the at least one of a temperature sensor and ice detection sensor, wherein the control system controls a quantity of thermal energy produced by the electrical resistive thermal material.

14. The air-breathing jet engine of claim 13, further comprising an electrical switching system in communication with the control system, wherein the electrical switching system controls a distribution of a quantity of electrical power generated by the reversed PMEG to the electrical resistive thermal material.

15. The air-breathing jet engine of claim 1, wherein the portion of the air-breathing jet engine on which the electrical resistive thermal material is positioned further comprises at least one of:
- an engine spinner;
- a fan blade;
- a low-pressure compressor casing; and
- a low-pressure compressor.

16. The air-breathing jet engine of claim 1, wherein the reversed PMEG further comprises a stator having the at least one fixed magnet, wherein the at least one rotatable winding is positioned interior of the stator.

17. A method of deicing an air-breathing jet engine, the method comprising the steps of:
creating a quantity of electrical power with a reversed permanent magnet electric generator (PMEG) driven by at least one rotatable shaft of an air-breathing jet engine, wherein the reversed PMEG has at least one fixed magnet and at least one rotatable winding;
sensing a thermal condition of an externally exposed portion of a rotatable fan blade of the air-breathing jet engine; and
supplying the quantity of electrical power to an electrical resistive thermal material positioned on the externally exposed portion of the rotatable fan blade of the air-breathing jet engine, whereby a quantity of thermal energy is provided to the externally exposed portion of the rotatable fan blade.

18. The method of claim 17, wherein creating the quantity of electrical power with the reversed PMEG with the at least one rotatable shaft further comprises rotating the at least one rotatable winding connected to the at least one rotatable shaft past a stator having the at least one fixed magnet.

19. The method of claim 17, further comprising controlling supplying the quantity of electrical power to the electrical resistive thermal material with a control system, wherein the control system further comprises an ice detection sensor.

20. The method of claim 19, further comprising controlling a distribution of the quantity of electrical power generated by the reversed PMEG to the electrical resistive thermal material with an electrical switching system in communication with the control system.

21. A system for deicing a turbofan, the turbofan having at least one rotatable shaft connected to a plurality of fan blades, comprising:
a reversed permanent magnet electric generator (PMEG) having a stator with at least one fixed magnet and at least one rotatable winding, wherein the at least one rotatable winding is mechanically connected to the at least one rotatable shaft, and wherein the stator is positioned between the at least one rotatable winding and the at least one rotatable shaft;
at least one electrical ground connection having a grounding cable connected between the at least one rotatable winding and an aircraft airframe, wherein the grounding cable is positioned at least partially through a hollow center of the at least one rotatable shaft;
an electrical resistive thermal material positioned on each of the plurality of fan blades; and
at least one electrical connection between the reversed PMEG and the electrical resistive thermal material, wherein the at least one electrical connection has at least one electrode positioned on an edge of each of the plurality of fan blades.

* * * * *